(12) United States Patent
Benson et al.

(10) Patent No.: US 10,079,677 B2
(45) Date of Patent: Sep. 18, 2018

(54) SECURE CIRCUIT FOR ENCRYPTION KEY GENERATION

(71) Applicant: Apple Inc., Cupertino, CA (US)

(72) Inventors: Wade Benson, San Jose, CA (US); Libor Sykora, Prague (CZ); Vratislav Kuzela, Cakovicky (CZ); Michael Brouwer, Los Gatos, CA (US); Andrew R. Whalley, San Francisco, CA (US); Jerrold V. Hauck, Windermere, FL (US); David Finkelstein, Sunnyvale, CA (US); Thomas Mensch, Sunnyvale, CA (US)

(73) Assignee: Apple Inc.

( * ) Notice: Subject to any disclaimer, the term of this patent is extended or adjusted under 35 U.S.C. 154(b) by 166 days.

(21) Appl. No.: 15/173,643

(22) Filed: Jun. 4, 2016

(65) Prior Publication Data

US 2017/0373843 A1    Dec. 28, 2017

Related U.S. Application Data

(60) Provisional application No. 62/276,940, filed on Jan. 10, 2016, provisional application No. 62/171,705, filed on Jun. 5, 2015.

(51) Int. Cl.
*H04L 29/06*    (2006.01)
*H04L 9/08*    (2006.01)
(Continued)

(52) U.S. Cl.
CPC .......... *H04L 9/0861* (2013.01); *G06F 21/32* (2013.01); *H04L 9/006* (2013.01); *H04L 9/14* (2013.01);
(Continued)

(58) Field of Classification Search
CPC ..... H04L 9/0861; H04L 9/3268; H04L 9/006; H04L 9/3239; H04L 9/14; H04L 9/3249; G06F 21/32; G06F 21/44
(Continued)

(56) References Cited

U.S. PATENT DOCUMENTS 5,712,912 A * 1/1998 Tomko ............... G06K 9/00067
380/256
6,202,151 B1 * 3/2001 Musgrave ............ G06Q 20/04
713/170
(Continued)

OTHER PUBLICATIONS

GlobalPlatform Device Technology, TEE System Architecture Version 1.0, Public Release Dec. 2011, 24 pages.
(Continued)

*Primary Examiner* — Syed Zaidi
(74) *Attorney, Agent, or Firm* — Meyertons, Hood, Kivlin, Kowert & Goetzel, P.C.

(57) ABSTRACT

Techniques are disclosed relating to relating to a public key infrastructure (PKI). In one embodiment, an integrated circuit is disclosed that includes at least one processor and a secure circuit isolated from access by the processor except through a mailbox mechanism. The secure circuit is configured to generate a key pair having a public key and a private key, and to issue, to a certificate authority (CA), a certificate signing request (CSR) for a certificate corresponding to the key pair. In some embodiments, the secure circuit may be configured to receive, via the mailbox mechanism, a first request from an application executing on the processor to issue a certificate to the application. The secure circuit may also be configured to perform, in response to a second request, a cryptographic operation using a public key circuit included in the secure circuit.

9 Claims, 7 Drawing Sheets

(51) Int. Cl.
  *H04L 9/32* (2006.01)
  *H04L 9/00* (2006.01)
  *G06F 21/32* (2013.01)
  *H04L 9/14* (2006.01)

(52) U.S. Cl.
  CPC .......... *H04L 9/3239* (2013.01); *H04L 9/3249* (2013.01); *H04L 9/3268* (2013.01)

(58) Field of Classification Search
  USPC ......................................................... 713/158
  See application file for complete search history.

(56) References Cited

U.S. PATENT DOCUMENTS

| | | | |
|---|---|---|---|
| 6,310,966 B1 * | 10/2001 | Dulude | G06Q 20/04 382/115 |
| 6,775,778 B1 * | 8/2004 | Laczko, Sr. | G06F 21/51 380/2 |
| 7,711,960 B2 | 5/2010 | Scarlata | |
| 8,775,757 B2 | 7/2014 | Polzin et al. | |
| 9,053,351 B2 * | 6/2015 | Boshra | G06F 21/32 |
| 9,173,101 B1 | 10/2015 | Angelov et al. | |
| 9,448,950 B2 | 9/2016 | Scarlata et al. | |
| 9,544,297 B2 * | 1/2017 | Resnitzky | H04L 63/0428 |
| 9,780,952 B1 * | 10/2017 | Behm | H04L 9/3247 |
| 2003/0076961 A1 * | 4/2003 | Kim | H04L 9/006 380/282 |
| 2003/0076962 A1 * | 4/2003 | Roh | H04L 9/006 380/282 |
| 2003/0221104 A1 * | 11/2003 | Baessler | H04L 63/062 713/175 |
| 2005/0222932 A1 * | 10/2005 | Murashita | G06Q 20/12 705/35 |
| 2008/0098214 A1 * | 4/2008 | Rodriguez Martinez | H04L 9/3268 713/156 |
| 2008/0104416 A1 | 5/2008 | Challener et al. | |
| 2008/0133539 A1 | 6/2008 | Kaarela et al. | |
| 2009/0031140 A1 * | 1/2009 | Abdallah | H04L 9/3231 713/186 |
| 2011/0113241 A1 * | 5/2011 | Umezawa | G06F 21/606 713/156 |
| 2013/0160115 A1 | 6/2013 | Venkataramanappa et al. | |
| 2014/0053278 A1 * | 2/2014 | Dellow | G06F 21/60 726/27 |
| 2014/0089617 A1 | 3/2014 | Polzin et al. | |
| 2014/0115324 A1 * | 4/2014 | Buer | H04L 9/3231 713/156 |
| 2016/0006754 A1 | 1/2016 | Woodward et al. | |
| 2016/0065374 A1 | 3/2016 | Sauerwald et al. | |
| 2016/0134621 A1 | 5/2016 | Palanigounder | |

OTHER PUBLICATIONS

TCG Published, Trusted Platform Module Library, Part 1: Architecture, Family "2.0", Level 00 Revision 01.16, Oct. 30, 2014, 269 pages.

* cited by examiner

SECURE CIRCUIT FOR ENCRYPTION KEY GENERATION

This application claims the benefit of U.S. Prov. Appl. Nos. 62/171,705 filed on Jun. 5, 2015 and 62/276,940 filed on Jan. 10, 2016, which are incorporated by reference herein in their entireties.

BACKGROUND

Technical Field

This disclosure relates generally to processors, and, more specifically, to processors that use public key encryption.

Description of the Related Art

Network traffic communicated over the Internet is often encrypted using various algorithms. One significant algorithm is the RSA algorithm (or simply RSA) named after the inventors Ron Rivest, Adi Shamir, and Leonard Adleman. RSA is an asymmetric cryptographic algorithm that employs a key pair, which includes a private key and a public key. The keys are generated such that data encrypted with the public key is decryptable using the private key. Thus, a first person who holds a private key can present a public key to a second person and receive data from the second person encrypted using the public key. Another property of the keys is that data encrypted with the private key is decryptable with the public key. Thus, a first person can confirm ownership of a private key to a second person, by encrypting a known set of data with a private key (referred to as generating a signature or signing the data) and allowing the second person to decrypt the known set of data with the public key.

Public key encryption can be exploited using a spoofing attack in which a third person presents a public key alleged to be from the first person and deceives a second person into encrypting data with that key (or believing that data signed with the corresponding private key is from the first person). In order to reduce the chances of spoofing, various entities (e.g., Comodo™, Symantec™, etc.) have developed public key infrastructures (PKIs). In such an infrastructure, a trusted certificate authority (CA) issues certificates that confirm the validity of public keys after verifying the identities of the key holders. To ensure that a certificate is valid, a certificate authority signs the certificate using its private key and presents its public key to anyone wishing to verify the certificate.

SUMMARY

The present disclosure describes embodiments in which public key encryption may be used. In one embodiment, an integrated circuit may include a processor and a secure circuit (referred to below as a secure enclave processor (SEP)) isolated from access by the processor except through a mailbox mechanism. The secure circuit may be configured to generate and maintain key pairs having a public key and a private key. The secure circuit may also include circuitry for performing cryptographic operations (e.g., encryption, decryption, and signature generation) using the keys.

In some embodiments, in order to attest to the validity of these keys, the secure circuit may issue certificate signing requests (CSR) to a certificate authority (CA) in order to receive corresponding certificates for these keys. In some embodiments, applications executing on the processor (e.g., third-party applications) may send requests to the secure circuit that ask it to perform cryptographic operations using the certified private keys. In some instances, using certified private keys maintained by the secure circuit is more secure than software-generated keys stored in system memory (e.g., uncertified keys generated by the applications themselves and potentially exposed to malicious software).

In some embodiments, the secure circuit may be included in a first computing device and used to unlock functionality on a second computing device coupled to the first computing device. In such an embodiment, the second computing device may present an authentication challenge to the first computing device, the challenge specifying a set of data to be signed by the first computing device. In response to receiving the challenge, the first computing device may use the secure circuit to sign the data with a key maintained in the secure circuit. In one embodiment, this unlocked functionality may include permitting access to confidential data stored on the second device.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

As used herein, the terms "first," "second," etc. are used as labels for nouns that they precede, and do not imply any type of ordering (e.g., spatial, temporal, logical, etc.). For example, an application may be described as sending first and second requests. The terms "first" and "second" do not indicate that the first request was an initial request or that the first request was sent before the second request.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 1A:
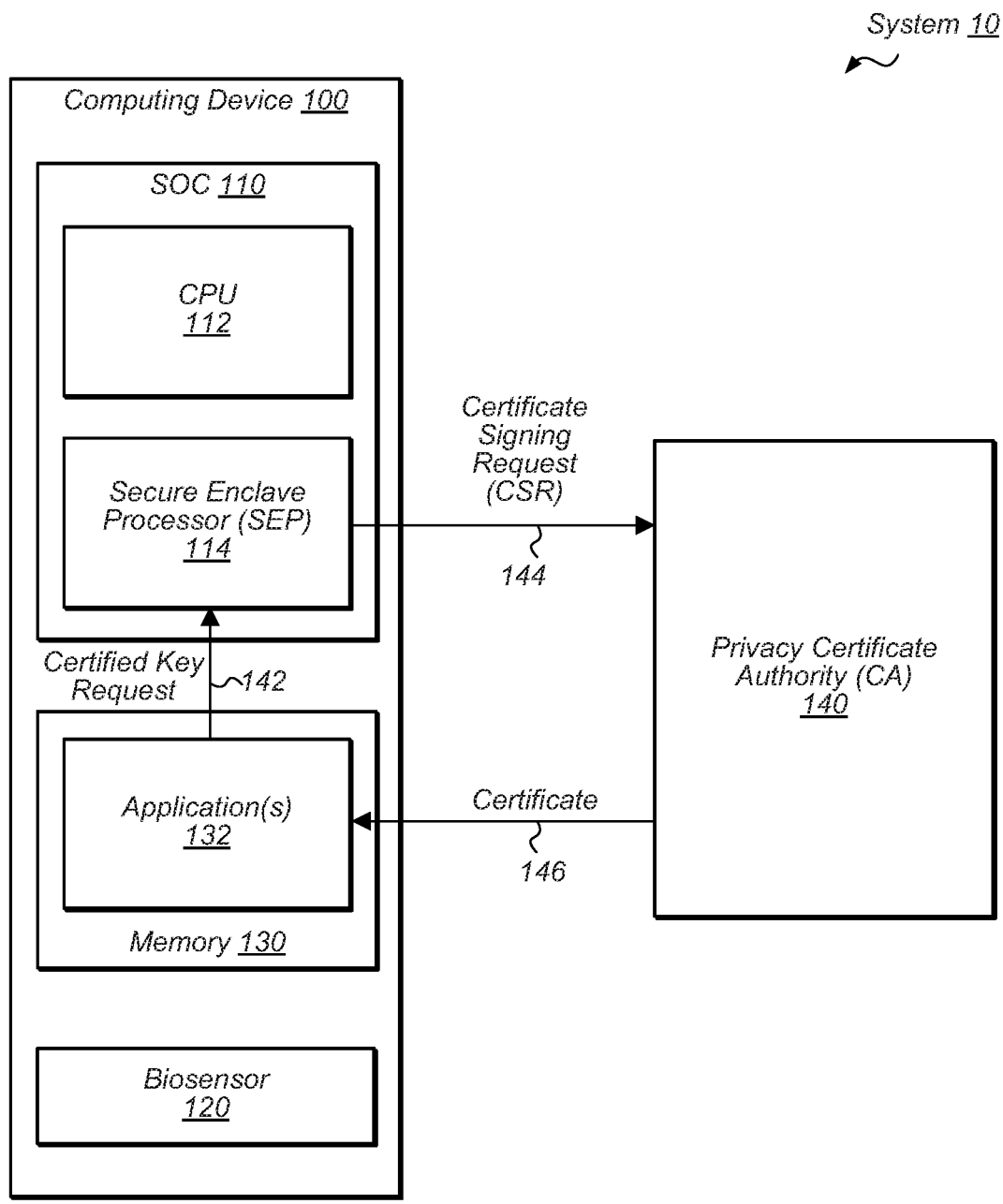
FIGS. 1A and 1B are block diagrams of embodiments of a system that uses a secure enclave processor (SEP) for public key encryption.
Figure 1B:
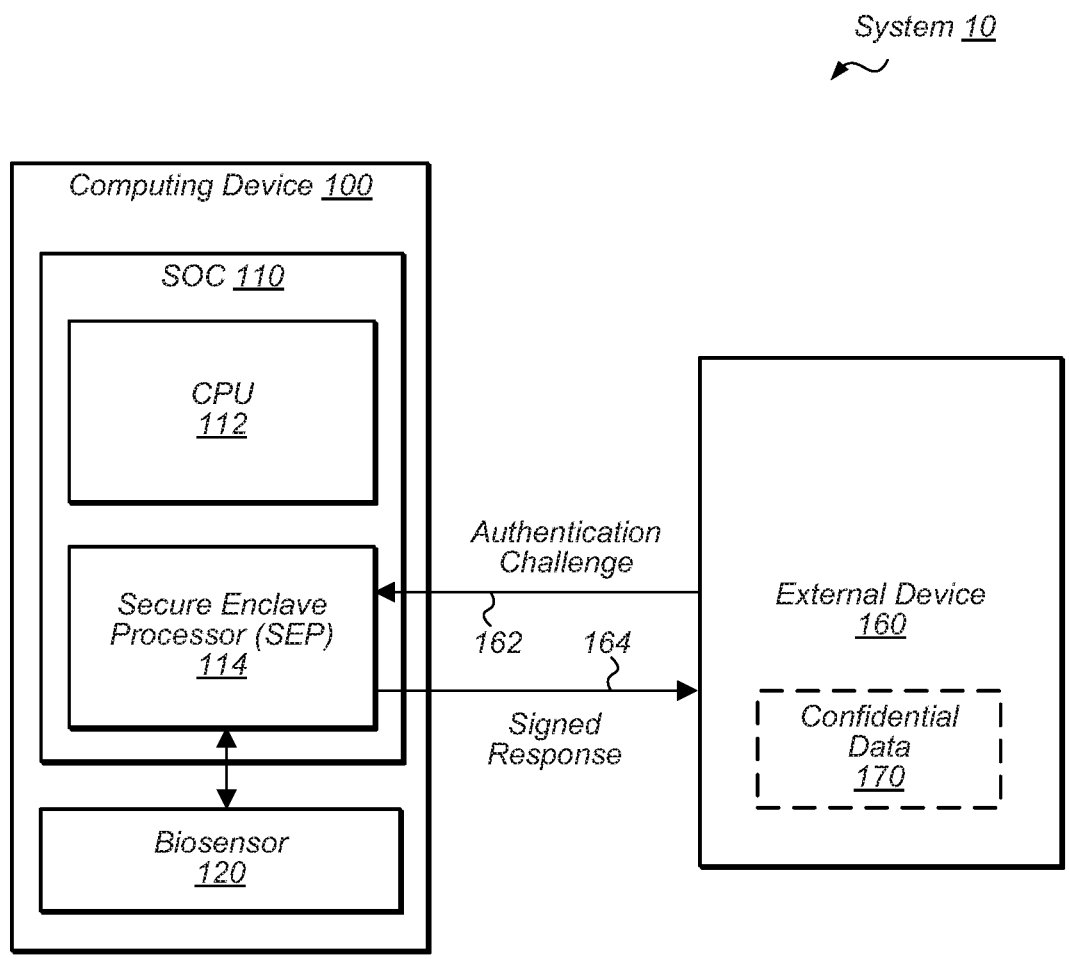
Figure 2:
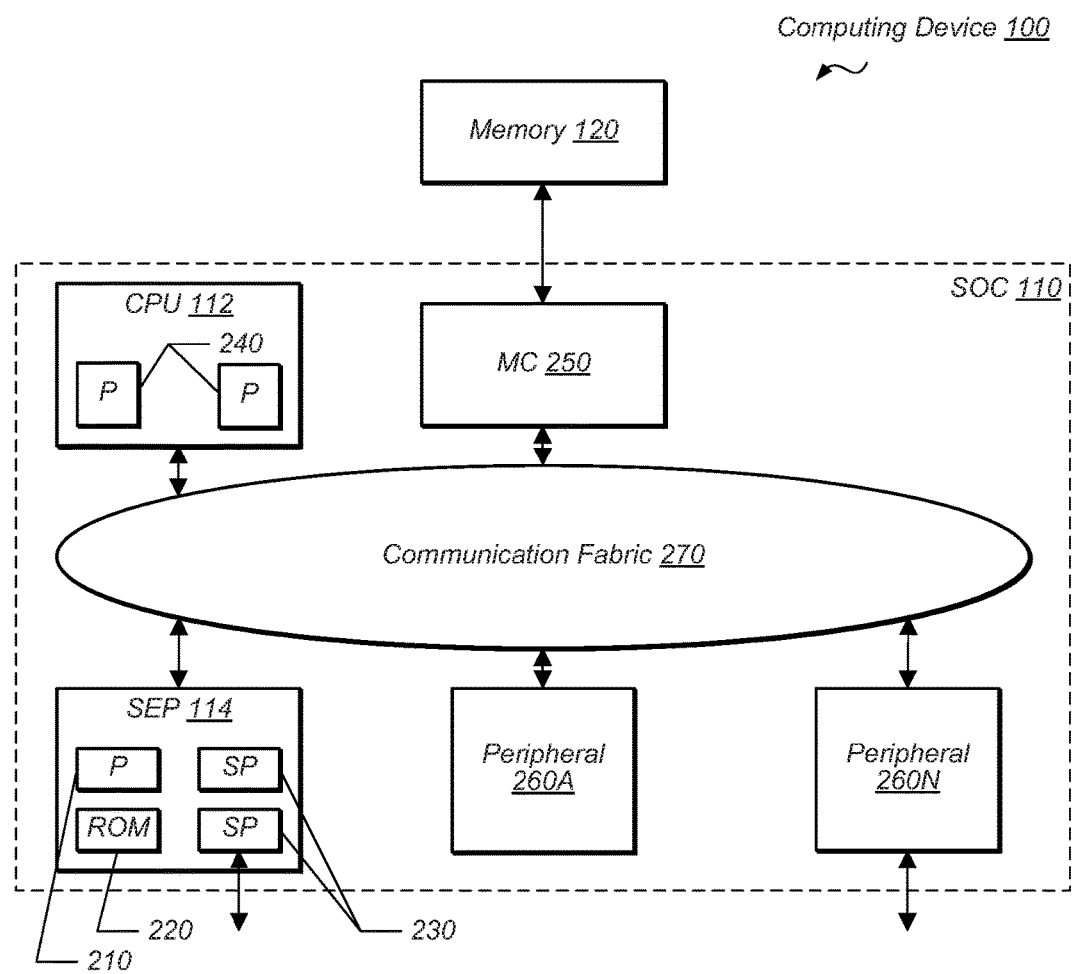
FIG. 2 is a block diagram of one embodiment of a computing device included within the system and includes a system on a chip (SOC).
Figure 3:
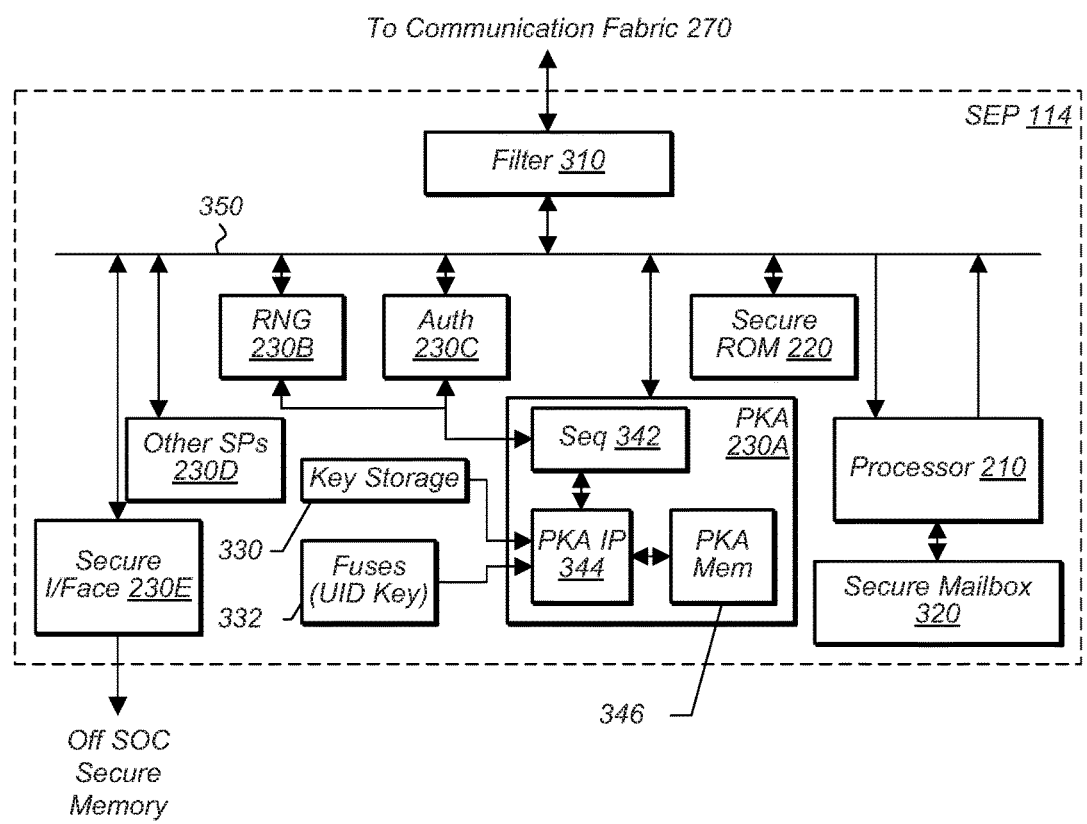
FIG. 3 is a block diagram of one embodiment of the SEP.
Figure 4:
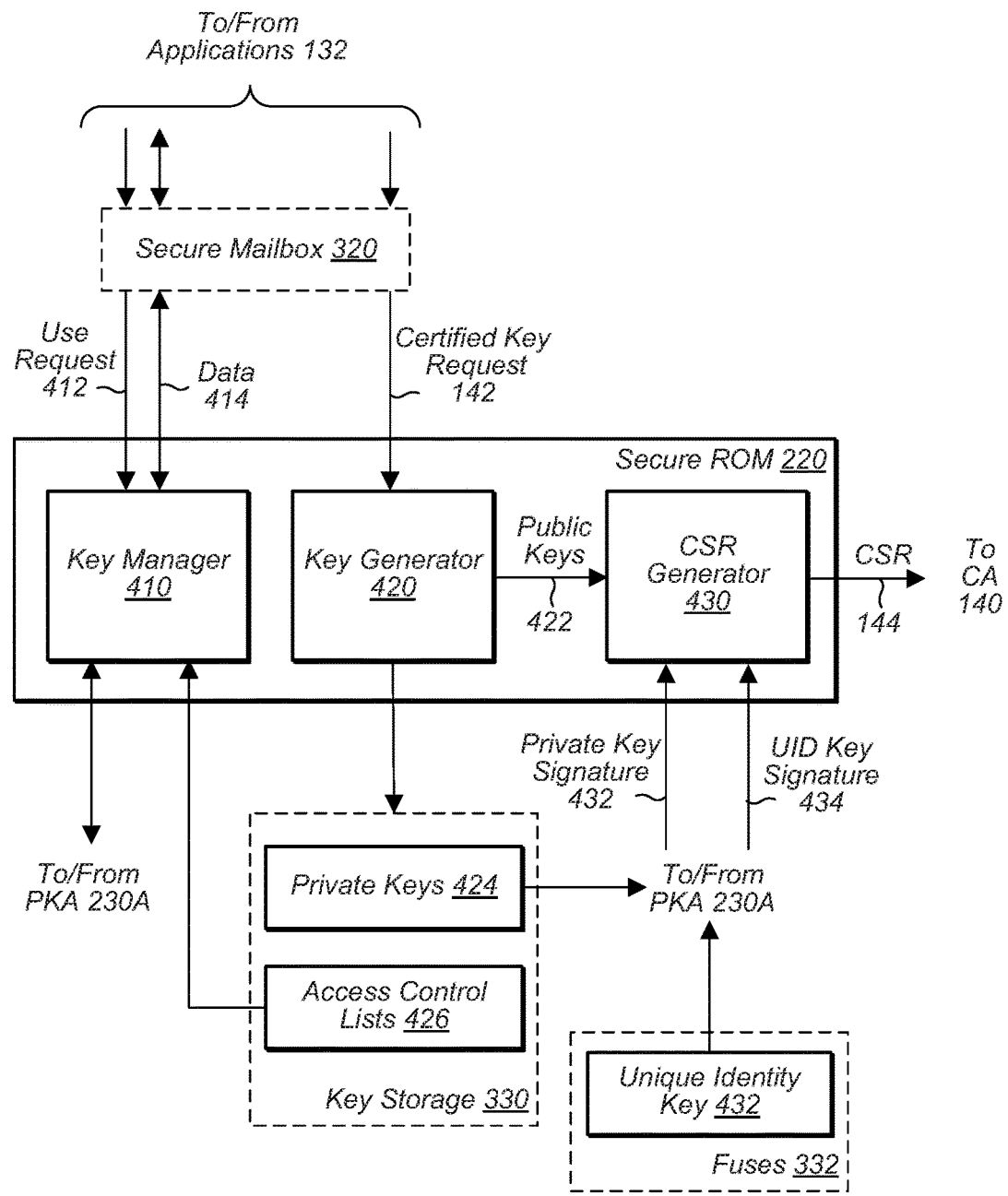
FIG. 4 is a block diagram of one embodiment of a memory that includes software components executable by the SEP.
Figure 5A:
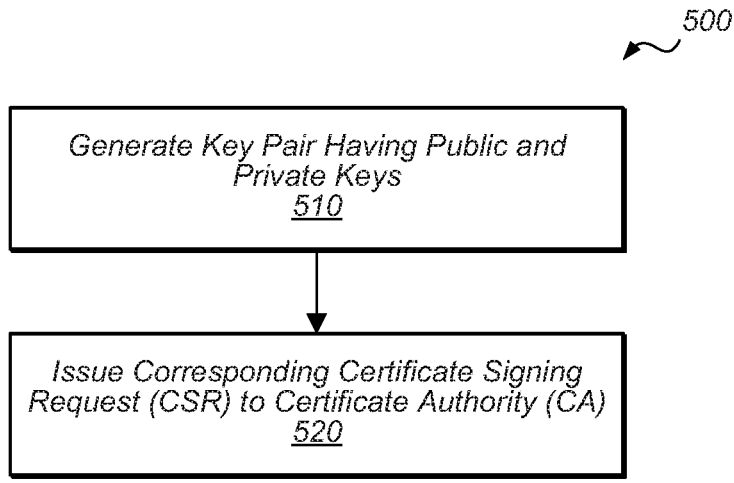
FIG. 5A is a flow diagram illustrating one embodiment of a method performed by the SEP.
Figure 5B:
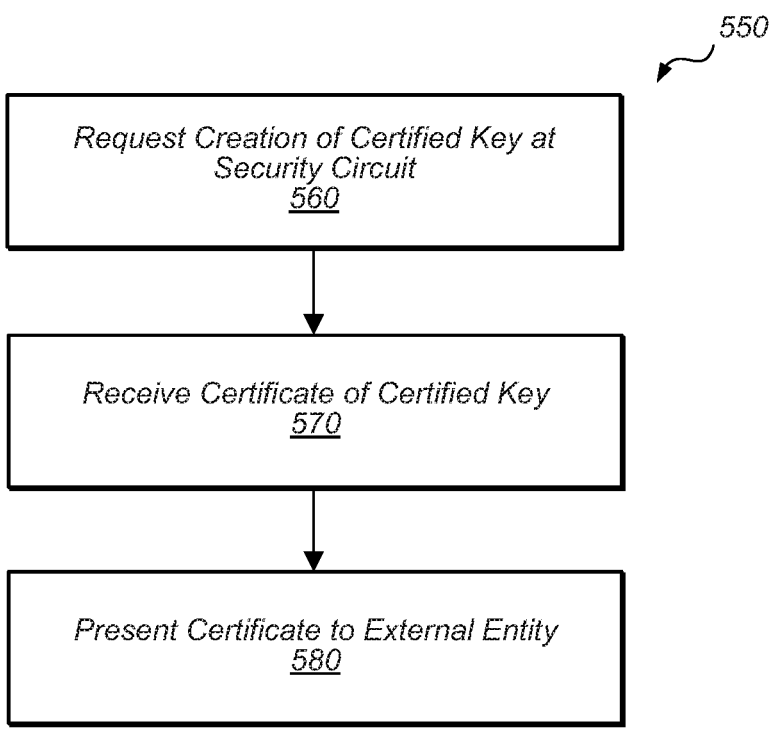
FIG. 5B is a flow diagram illustrating one embodiment of a method performed by an application that interacts with the SEP.
Figure 6:
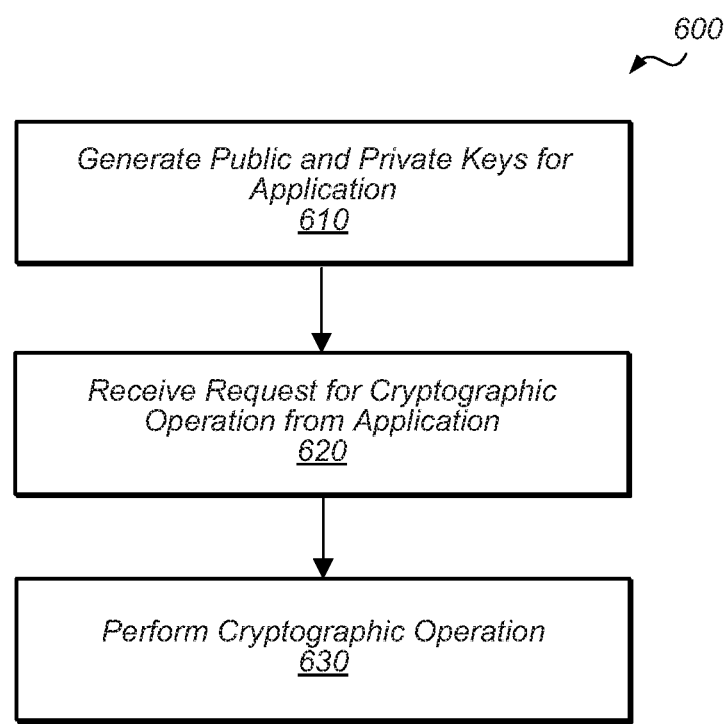
FIG. 6 is a flow diagram illustrating another embodiment of a method performed by the SEP.

Various embodiments are described below in which a secure enclave processor (SEP) may be used. FIGS. 1A and 1B present embodiments of a system that includes the SEP and uses a public key infrastructure. FIG. 2 presents one embodiment of a system on a chip (SOC) that includes the SEP. FIG. 3 presents embodiments of hardware components that may be included in the SEP. FIG. 4 presents embodiments of software components that may be executed by the SEP. Finally, FIGS. 5A, 5B, and 6 present embodiments of methods that may be performed in conjunction with the SEP.

Turning now to FIG. 1A, a block diagram of one embodiment of a system 10 that uses a public key infrastructure is depicted. In the illustrated embodiment, system 10 includes computing device 100 and a certificate authority 140. Computing device 100 may correspond to any suitable computer system. Accordingly, in some embodiments, device 100 may be a mobile device (e.g., a mobile phone, a tablet, personal data assistant (PDA), etc.), desktop computer system, server system, network device (e.g., router, gateway, etc.), microcontroller, etc. In the illustrated embodiment, computing device 100 includes a system on a chip (SOC) 110, biometric sensor 120 (more briefly "biosensor" 120), and memory 130. As implied by the name SOC, the components of the SOC 110 may be integrated onto a single semiconductor substrate as an integrated circuit chip. In some embodiments, the components may be implemented on two or more discrete chips in a system. As shown, SOC 110 may include a central processing unit (CPU) 112 and a secure enclave processor (SEP) 114. Memory 130 may include one or more applications 132. In some embodiments, system 10 may implement functionality described herein without use of a CA 140.

Secure enclave processor (SEP) 114 is one embodiment of a secure circuit or a secure component. As used herein, the term "secure circuit" refers to a circuit that protects an isolated, internal resource from being directly accessed by an external circuit. This internal resource may be memory that stores sensitive data such as personal information (e.g., biometric information, credit card information, etc.), encryptions keys, random number generator seeds, etc. This internal resource may also be circuitry that performs services/operations associated with sensitive data. As will be described below, these services may include various cryptographic services such as authentication, encryption, decryption, etc. Secure services may include secure key generation, which may include shared secret keys and asymmetric keys (i.e., public and private keys). In various embodiments, secure services also include generating certificate signing requests (CSRs) 144 for certificates 146 associated with generated keys. Generally, a component external to SEP 114 may transmit a request for a secure service to SEP 114, which may have internal circuitry perform the secure service. SEP 114 may then return a result, which may include data generated by performing the service and/or an indication of success/failure of the request. For example, the result of encryption/decryption may be the encrypted/decrypted data and/or an indication of a pass/fail. In various embodiments, SEP 114 may determine whether to perform a requested service based on identity information provided by biosensor 120.

Biosensor 120, in one embodiment, is configured to detect biometric data for a user of computing device 100. Biometric data may be data that uniquely identifies the user among other humans (at least to a high degree of accuracy) based on the user's physical or behavioral characteristics. For example, in some embodiments, sensor 120 is a finger print sensor that captures fingerprint data from the user. In one embodiment, SEP 114 may maintain previously captured fingerprint data of an authorized user and compare it against newly received fingerprint data from sensor 120 in order to authenticate a user. (In another embodiment, biosensor 120 may perform the comparison.) If the fingerprint data matches, SEP 114 may permit performance of a requested service. In some embodiments, communications between SEP 114 and biosensor 120 may be encrypted using a key shared between SEP 114 and biosensor 120 such that another circuit (e.g., CPU 112) is unable to view communicated fingerprint data. In some embodiments, other types of biometric data may be captured by sensor 120 such as voice recognition (identifying the particular user's voice), iris scanning, etc. It is noted that SEP 114 may also compare information collected from sources other than sensor 120 in order to verify the identity of a user, in some embodiments. Accordingly, computing device 100 may include other user interface circuits (e.g., a touch screen) configured to receive authentication information (e.g., a passcode or password) from a user, and SEP 114 may verify that the received authentication information is correct.

Applications 132, in one embodiment, are applications that may use services of SEP 114 and are executable on CPU 112. (Although depicted as residing in memory 130 in the illustrated embodiment, applications 132 may be located elsewhere in computing device 100 and even externally to computing device 100—in such an embodiment, an application 132 may execute on another device and may communicate with computing device 100 via a network interface of device 100). In various embodiments, applications may include third-party applications (i.e., applications created by an entity that is not a manufacturer of computing device 100). Applications 132 may request, for example, that SEP 114 perform encryption (and decryption) operations using keys accessible within SEP 114 and using dedicated cryptographic circuitry in SEP 114 (discussed with respect to FIGS. 3 and 4). An application 132 may then perform various operations with the encrypted data such as communicating the encrypted data with an external entity, storing the data locally as protected data of the application, communicating a secret key as part of a key exchange, etc. Applications 132 may also request that SEP 114 sign payloads provided by applications 132 with keys accessible in SEP 114. In some embodiments, SEP 114 is configured to store multiple keys, each associated with a respective application 132. For example, SEP 114 may maintain one or more private keys for a banking application 132 and one or more private keys for an instant messaging application 132. As will be described below, in various embodiments, applications 132 may further request that SEP 114 obtain certificates for key pairs generated for applications 132 (e.g., via certified key requests 142 in the illustrated embodiment).

In various embodiments, SEP 114 is isolated from instructions executable on CPU 112 (e.g., applications 132) except through a mailbox mechanism (described in conjunction with FIGS. 2 and 3) in SEP 114. (As used herein, a mailbox mechanism refers to a memory circuit that temporarily stores 1) an input for a secure circuit until it can be retrieved by the circuit and/or 2) an output of a secure circuit until it can be retrieved by an external circuit.) In one embodiment, applications 132 may request services of SEP 114 via an application programming interface (API) supported by an operating system of computing device 100—i.e., applications 132 may make API calls that request services of SEP 114. These calls may cause an operating system executing on CPU 112 to write corresponding requests to the mailbox mechanism, which are then retrieved and analyzed by SEP 114 to determine whether it should service the requests. By isolating SEP 114 in this manner, secrecy of maintained private keys may be enhanced. To obtain private keys, for example, a nefarious actor may be required to somehow carefully observe the hardware rather than find a way to break the software.

Private certificate authority (CA) 140, in one embodiment, issues certificates that certify the ownership of public keys and are usable to verify that owners are in possession of the corresponding private keys. In some embodiments, CA 140 may also operate as a registration authority (RA) (or operate in conjunction with an RA, in other embodiments) that authenticates an entity, such as SEP 114, before issuing a requested certificate. CA 140 may also periodically revoke certificates at the request of key holders or if their private keys have potentially been compromised. In one embodiment, CA 140 may be implemented by a manufacturer of computing device 100.

As noted above, in the illustrated embodiment, an application 132 may initiate creation of a certificate 146 by sending a certified key request 142 to SEP 114 for a certified key. As used herein, the term "certified key" generally refers to a public key or a private key of a key pair for which a corresponding certificate 146 has been issued. Upon receiving a key request 142, SEP 114 may, in turn, issue a corresponding certificate signing request (CSR) 144 for a generated key pair to CA 140. After reviewing the CSR 144, CA 140 may issue a corresponding certificate 146 to computing device 100.

Key requests 142 may include any suitable information. In one embodiment, a request 142 may specify the application's intended use of the key pair. For example, an application 132 may specify that it intends to use the key pair to generate signatures (e.g., using a digital signature algorithm (DSA)), establish transport layer security (TLS) sessions, etc. In some embodiments, a request 142 may also specify usage criteria that restrict how a key is used. For example, as will be discussed with FIG. 4, an application 132 may request that SEP 114 verify biometric information from biosensor 120 before performing a requested service using the corresponding private key. In some embodiments, SEP 114 may store in the intended use and usage criteria to facilitate subsequent management of the key pair.

As used herein, the term "certificate signing request" refers generally to a request for a trusted authority to verify a collection of information attesting to the validity of a public key pair. Certificate signing requests 144 may include any suitable information. In one embodiment, a request 144 includes an identifier of the requesting application, the public key, and a signature produced from the corresponding private key. As will be described below in conjunction with FIGS. 3 and 4, in various embodiments, SEP 114 is configured to sign CSRs 144 with a private, unique identity key for which CA 140 knows the corresponding public key. In such an embodiment, CA 140 authenticates SEP 114 (or, more generally, computing device 100) by verifying the signature of unique identity key and verifying the signature of newly generated private key with the public key in the CSR 144. In some embodiments, this unique identity key is stored in SEP 114 during manufacture of SEP 114 (or, more generally, manufacture of computing device 100). In some embodiments, however, a CSR 144 may include information other than a signature generated by a unique identity key to attest to the validity of the key pair such as a shared secret known only to SEP 114 and computer system 140, information about hardware in SEP 114 or device 100 (e.g., a unique machine ID known only to CA 140), information about a user (e.g., user identifier known only to CA 140), etc. In some embodiments, the request 144 may further include the intended use for the key pair and any usage criteria (e.g., as defined by the key request 142, a manufacture of computing device 100, etc.). In some embodiments, CSRs 144 are in accordance with a standard format such as defined by the public-key cryptography standards (PKCS) #10 specification.

In various embodiments, CA 140 issues a certificate 146 in response to successfully verifying the information in CSR 144. As used herein, the term "certificate" refers generally to a collection of information (e.g., a token) that can be presented to establish that a trusted authority has verified information attesting to the validity of a public-key pair. Certificates 146 may include any of suitable information. In one embodiment, a certificate 146 includes an identifier of CA 140, the public key presented in the CSR 144, a period for when the certificate is valid, and a signature generated from the certificate 146 using a private key held by CA 140. In some embodiments, certificate 146 may identify the application 132 for which the certificate is issued. In some embodiments, certificate 146 may further include the intended use for the key pair and any usage criteria for the key pair (e.g., as specified by the corresponding CSR 144). Thus, an entity that receives encrypted data (or a digital signature) associated with a certificate 146 can be assured that the data was produced in accordance with the specified usage criteria (e.g., that biometric data was verified before key use). In some embodiments, certificates 146 are in accordance with a standard format such as defined by the X.509 standard.

In various embodiments, CA 140 is further configured to include information about computing device 100 in certificate 146. In some embodiments, this information identifies the presence of particular hardware in computing device 100. For example, in one embodiment, certificate 146 may indicate 1) make and model information about the particular version of SOC 110, 2) that computing device 100 includes SEP 114 and biosensor 120, 3) that SEP 114 includes a public key accelerator (PKA) (such as PKA 230A discussed below with respect to FIG. 3), etc. In some embodiments, this information identifies particular functionality supported by computing device 100. For example, in one embodiment, certificate 146 may indicate 1) that device 100 is able to collect biometric information from a user, 2) that device 100 supports performing 256-bit Advanced Encryption Standard (AES) operations using dedicated circuitry, etc. In some embodiments, this information about device 100 may be collected at fabrication and stored in CA 140, so that the information is later accessible to CA 140 for inclusion in certificates 146.

In various embodiments, an entity that is interacting with device 100 (e.g., through an application 132) may analyze a certificate 146 received from device 100 in order to extract the included information about device 110. The entity may then choose different courses of action based on the presence of this information. For example, upon determining that device 100 includes SEP 114 and biosensor 120, the entity may place greater trust in device 110 and allow a user of device 100 to perform various activities that would not be permitted if device 100 did not include SEP 114 and biosensor 120. Notably, in such an embodiment, device 100 may not be able to tamper with the information in certificate 146 because it is inserted by CA 140 and the certificate 146 is then signed by CA 140. Thus, if the entity trusts CA 140, the entity can determine that the information about device 100 is accurate as long as it can verify the integrity of the certificate 146.

In various embodiments, certificates 146 do not, however, include information usable to identify computing device 100 in order to protect the privacy of computing device 100 (and, more specifically, the privacy of the user of computing device 100). For example, computing device 100 is not identified in a certificate 146 as the owner of the corresponding public key. In such an embodiment, it may also be impossible to determine, from information in certificates 146, that a correlation exists between certificates 146 issued for the same computing device 100. For these reasons, CA 140 is identified as a "privacy" CA in the illustrated embodiment. For these reasons, SEP 114 is also not made an intermediate CA of CA 140, in various embodiments, as certificates issued from SEP 114 may identify SEP 114 as the issuing entity—thus, allowing computing device 100 to potentially be identified and tracked.

Upon receiving a certificate 146, an application 132 may present the certificate 146 to an entity with which the application 132 wishes to communicate. As noted above, this communication may include the exchange of encrypted data and/or signatures using private keys maintained by SEP 114. As one example, a user may access bank account information using a banking application. Initially, the user may authenticate using a user name and password. The application may, however, ask the user if he/she prefers using biosensor 120 for authentication. If the user indicates this preference, the application may issue a certified key request 142 to SEP 114 and receive a corresponding certificate 146. The application may further specify in its request 142 that biometric data be collected and verified prior to using the certified key. When the user attempts to use the banking application again, rather than having the user enter a name and password, the application may issue a request to SEP 114 to have it generate a signature. SEP 114 may then authenticate the user via biosensor 120 and generate the signature in response to a successful authentication. The application may then present the signature along with the certificate 146 to the banking entity, which uses the signature and certificate to authenticate the user. (It is noted that, in generating a signature for authentication, SEP 114 may function in a similar manner as a smart card.) Authenticating the user in this manner is easier on the user than manually entering in a name and password. Using a private key maintained by SEP 114 can also be more secure than having the application generate and store its own key pair in memory 130, which may be vulnerable to malicious discovery.

Turning now to FIG. 1B, a block diagram of another embodiment of system 10 is depicted. As noted above, in some embodiments, a secure circuit (e.g., SEP 114) on one device may be used to unlock (i.e., enable) functionality of another, different device. Accordingly, in the illustrated embodiment, computing device 100 may use SEP 114 to unlock functionality on external device 160, which may communicate with device 100 via a network interface of device 100. In some embodiments, this network interface is a wireless interface such as one configured to support Bluetooth™, Wi-Fi™, a cellular radio access technology, etc. External device 160 may correspond to any suitable device such as those listed above with respect to computing device 100. In the illustrated embodiment, privacy CA 140 is not used; however, in other embodiments, CA 140 may be employed.

In some embodiments, this functionality may include access to external device 160. For example, external device 160 may present a login screen asking for a user name and/or password on a display of external device 160. Instead of entering this information, a user may enroll in a service that allows the user to authenticate via computing device 100. When enrolled, devices 100 and 160 may use a challenge response scheme to authenticate device 100 (or, more specifically, a user of device 100). In the illustrated embodiment, this scheme includes external device 160 presenting an authentication challenge 162 to device 100. SEP 114 may then use an internal key (such as discussed above and below) to sign data in the challenge 162 to produce a signed response 164. In various embodiments, before signing the data, SEP 114 may verify use criteria for the key (e.g., an access control list 426 discussed below with FIG. 4) to be used in signing the data. Upon receiving response 164, external device 160 may verify the signed data in the response 164 against the previous data in the challenge 162 in order to verify authentication of device 100. If verification is successful, external device 160 may remove the login screen and allow the user to access device 160. (As noted above, when authentication is performed in this manner, SEP 114 may function as a smart card to verify a user's identity.)

In some embodiments, SEP 114 may be used to unlock functionality other than mere access to external device 100. Accordingly, in the illustrated embodiment, external device 160 may store various forms of confidential data 170 in a secure manner (e.g., via encryption, memory isolation, etc.). This data 170 may include keychain data (e.g., user names and passwords), bank account information, user contact information, etc. In such an embodiment, SEP 114 may be used to unlock access to this data 170 via challenge 162 and response 164. For example, in one embodiment, upon authenticating device 100, external device 160 may decrypt a portion of confidential data 170 and present the data to the user. (In another embodiment, external device 160 may send the portion of data 170 to device 100 for decryption at SEP 114 using a key maintained by SEP 114.) In some embodiments, unlocked functionality may include execution of particular applications. For example, external device 160 may not permit access to a mail application unless an authentication with device 100 has been performed. In some embodiments, unlocked functionality may include use of particular hardware—e.g., a network interface of device 160, a storage device of device 160, etc.

Turning now to FIG. 2, a block diagram of SOC 110 is shown coupled to a memory 130. In the illustrated embodiment, SOC 110 includes CPU 112, SEP 114, a memory controller 250, peripheral components 260A-260N (more briefly, 'peripherals 260' or 'peripheral components 260'), and a communication fabric 270. The components 112, 114, 250, and 260 may all be coupled to the communication fabric 270. The memory controller 250 may be coupled to the memory 130. As shown, CPU 112 may include one or more processors (P 240 in FIG. 2). In the illustrated embodiment, SEP 114 includes one or more processors 210, a secure ROM 220, and one or more security peripherals 230. SEP 114 may, however, include any desired circuitry (e.g. cryptographic hardware, hardware that accelerates certain operations that are used in cryptographic functions, etc.). Accordingly, although depicted with a processor 210, in other embodiments, a processor may not be included.

SEP processor 210 may execute securely loaded software. For example, a secure read-only memory (ROM) 220 may include software executable by SEP processor 210. One or more of the security peripherals 230 may have an external interface, which may be connected to a source of software (e.g. a non-volatile memory such as Flash memory). In another embodiment, the source of software may be a non-volatile memory coupled to another peripheral 230, and the software may be encrypted to avoid observation by a third party. The software from the source may be authenticated or otherwise verified as secure, and may be executable by SEP processor 210. In some embodiments, software may be loaded into a trust zone in memory 130 that is assigned to the SEP 114, and SEP processor 210 may fetch the software from the trust zone for execution. The software may be stored in the memory 130 in encrypted form to avoid observation. Despite the steps taken to ensure security of the secure software, the secure software may still be prevented from directly accessing/obtaining stored private keys. Only hardware may have access to private keys, in an embodiment.

As noted above, SEP 114 may be isolated from the rest of the SOC 110 except for a carefully controlled interface (thus forming a secure enclave for SEP processor 210, secure ROM 220, and security peripherals 230). Because the interface to SEP 114 is carefully controlled, direct access to SEP processor 210, secure ROM 220, and security peripherals 230 may be prevented. In one embodiment, a secure mailbox mechanism may be implemented. In the secure mailbox mechanism, external devices may transmit messages to an inbox. SEP processor 210 may read and interpret the message, determining the actions to take in response to the message. Response messages from the SEP processor 210 may be transmitted through an outbox, which is also part of secure mailbox mechanism 320. Other interfaces that permit only the passing of commands/requests from the external components and results to the external components may be used. No other access from the external devices to SEP 114 may be permitted, and thus the SEP 114 may be "protected from access". More particularly, software executed anywhere outside SEP 114 may be prevented from direct access to the secure components with the SEP 114. SEP processor 210 may determine whether a command is to be performed. In some cases, the determination of whether or not to perform the command may be affected by the source of the command. That is, a command may be permitted from one source but not from another.

Security peripherals 230 may be hardware configured to assist in the secure services performed by SEP 114. As will be described with respect to FIG. 3, security peripherals 230 may include authentication hardware implementing/accelerating various authentication algorithms, encryption hardware configured to perform/accelerate encryption, secure interface controllers configured to communicate over a secure interface to an external (to SOC 110) device, etc.

As mentioned above, CPU 112 may include one or more processors 240. Generally, a processor may include circuitry configured to execute instructions defined in an instruction set architecture implemented by the processor. Processors 240 may include (or correspond to) processor cores implemented on an integrated circuit with other components as a system on a chip (SOC 110) or other levels of integration. Processors 240 may further include discrete microprocessors, processor cores and/or microprocessors integrated into multichip module implementations, processors implemented as multiple integrated circuits, etc.

Processors 240 may execute the main control software of the system, such as an operating system. Generally, software executed by CPU 112 during use may control the other components of the system to realize the desired functionality of the system. The processors may also execute other software, such as applications 132. These applications may provide user functionality, and may rely on the operating system for lower-level device control, scheduling, memory management, etc. Accordingly, processors 240 (or CPU 112) may also be referred to as application processors. CPU 112 may further include other hardware such as an L2 cache and/or an interface to the other components of the system (e.g. an interface to the communication fabric 270).

Memory controller 250 may generally include the circuitry for receiving memory operations from the other components of SOC 110 and for accessing the memory 130 to complete the memory operations. Memory controller 250 may be configured to access any type of memory 130. For example, memory 130 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Memory controller 250 may include queues for memory operations, for ordering (and potentially reordering) the operations and presenting the operations to the memory 130. The memory controller 250 may further include data buffers to store write data awaiting write to memory and read data awaiting return to the source of the memory operation. In some embodiments, memory controller 250 may include a memory cache to store recently accessed memory data. In SOC implementations, for example, the memory cache may reduce power consumption in the SOC by avoiding reaccess of data from the memory 130 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 250.

Peripherals 260 may be any set of additional hardware functionality included in SOC 110. For example, peripherals 260 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 260 may include audio peripherals such as microphones, speakers, interfaces to microphones and speakers, audio processors, digital signal processors, mixers, etc. Peripherals 260 may include interface controllers for various interfaces external to SOC 110 including interfaces such as Universal Serial Bus (USB), peripheral component interconnect (PCI) including PCI Express (PCIe), serial and parallel ports, etc. Peripherals 260 may include networking peripherals such as media access controllers (MACs). Any set of hardware may be included.

Communication fabric 270 may be any communication interconnect and protocol for communicating among the components of SOC 110. Communication fabric 270 may be bus-based, including shared bus configurations, cross bar configurations, and hierarchical buses with bridges. Communication fabric 270 may also be packet-based, and may be hierarchical with bridges, cross bar, point-to-point, or other interconnects.

It is noted that the number of components of the SOC 110 (and the number of subcomponents for those shown in FIG. 2, such as within the CPU 112 and SEP 114) may vary from embodiment to embodiment. There may be more or fewer of each component/subcomponent than the number shown in FIG. 2.

Turning now to FIG. 3, a block diagram of SEP 114 in greater detail is shown. In the illustrated embodiment, SEP 114 includes the SEP processor 210, secure ROM 220, security peripherals 230A-230E, filter 310, secure mailbox 320, a key storage 330, and fuses 332. Filter 310 may be coupled to communication fabric 270 and to a local interconnect 350 to which the other components of SEP 114 are also coupled. Like communication fabric 270, local interconnect 350 may have any configuration (bus-based, packet-based, hierarchical, point-to-point, cross bar, etc.). Security peripheral 230A is public key accelerator (PKA), which may include a sequencer 342, a PKA intellectual property (IP) circuit 344, and a PKA memory 346. Sequencer 342 may be coupled to interconnect 350, secure peripherals 230B-230C, and PKA IP circuit 344. PKA IP circuit 344 may be configured to receive private keys from key storage 330 and/or fuses 332. SEP processor 210 is coupled to secure mailbox 320.

Filter 310 may be configured to tightly control access to SEP 114 to increase the isolation of the SEP 114 from the rest of the SOC 110, and thus the overall security of the SOC 110. More particularly, in one embodiment, filter 310 may permit read/write operations from the communication fabric 270 to enter SEP 114 only if the operations address the secure mailbox 320. Other operations may not progress from the fabric 270 into SEP 114. Even more particularly, filter 310 may permit write operations to the address assigned to the inbox portion of secure mailbox 320, and read operations to the address assigned to the outbox portion of the secure mailbox 320. All other read/write operations may be prevented by the filter 310. In some embodiments, filter 310 may respond to other read/write operations with an error. In one embodiment, filter 310 may sink write data associated with a filtered write operation without passing the write data on to local interconnect 350. In an embodiment, filter 310 may supply nonce data as read data for a filtered read operation. Nonce data may generally be data that is not associated with the addressed resource within the SEP 114. Nonce data is sometimes referred to as "garbage data." Filter 310 may supply any data as nonce data (e.g. all zeros, all ones, random data from a random number generator, data programmed into filter 310 to respond as read data, the address of the read transaction, etc.).

In various embodiments, filter 310 may only filter incoming read/write operations. Thus, the components of the SEP 114 may have full access to the other components of SOC 110 and memory 130. Accordingly, filter 310 may not filter responses from fabric 270 that are provided in response to read/write operations issued by SEP 114.

Secure mailbox 320 may include an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from the fabric 270 (e.g. issued by one of processors 240). The outbox may store write data from write operations sourced by processor 210 (which may be read by read operations sourced from fabric 270, e.g. read operations issued by one of CPU processors 240).

Secure ROM 220 is coupled to local interconnect 350, and may respond to an address range assigned to secure ROM 220 on the local interconnect 350. The address range may be hardwired, and processor 210 may be hardwired to fetch from the address range at boot in order to boot from secure ROM 220. Filter 310 may filter addresses within the address range assigned to secure ROM 220 (as mentioned above), preventing access to secure ROM 220 from components external to the SEP 114. As mentioned previously, secure ROM 220 may include the boot code for the SEP 114. Additionally, in some embodiments, secure ROM 220 may include other software executed by SEP processor 210 during use. This software may include the code to process inbox messages and generate outbox messages, code to interface to the security peripherals 230A-230E, etc. As will be described below with respect to FIG. 4, this software may include code for generating keys, managing keys, and generating certificate signing requests (CSRs) 144. In an embodiment, secure ROM 220 may store all the code that is executed by SEP processor 210 during use.

SEP processor 210 may process commands received from various sources in the SOC 110 (e.g. from processors 240) and may use various secure peripherals to accomplish the commands. In the case of commands that involve private keys, SEP processor 210 may provide the command to PKA 230A (and more particularly to sequencer 342). Sequencer 342 may include circuitry that decodes the command and generates a series of subcommands to implement the command. In an embodiment, sequencer 342 may include a read-only memory (ROM) that stores sequences of subcommands for each command supported by the PKA 230A. Other embodiments may employ hardware decoding, or a combination of hardware decoding and ROM implementations.

The subcommands may include subcommands for PKA IP circuit 344, which may perform operations that manipulate private keys and other operations. The subcommands may further include subcommands for operations performed by other SPs 230. Accordingly, in the illustrated embodiment, subcommands may be performed by random number generator circuit 230B and authentication circuit 230C. Sequencer 342 may be coupled to SPs 230B-230C, and may arbitrate or otherwise coordinate access to SPs 230-230C with processor 210.

In the illustrated embodiment, storage 330 and fuses 332 store private keys that are retrievable by PKA IP 344. In one embodiment, key storage 330 is a non-volatile memory that stores keys generated by SEP 114. In some embodiments, key storage 330 is configured to be written via interconnect 350, but may be read only by PKA 230A. In various embodiments, keys in storage 330 may be encrypted PKA 230A until they are needed by PKA 230A. In some embodiments, decrypting keys in storage 330 may require PKA 230A receiving a portion of a key from an external source—e.g., biometric information, a user's passcode, information from an application 132 (e.g., a password of the application 132), etc. As described below with FIG. 4, keys may also be wrapped with (i.e., encrypted with) an access control list that indicates usage criteria for keys. In one embodiment, fuses 332 may maintain one or more keys that are stored at fabrication of SEP 114. That is, a key may be set by burning out ones of fuses 332. In the illustrated embodiment, one of these keys includes a unique identity (UID) key stored by the manufacturer of SEP 114. As noted above and described with FIG. 4, this key may be used to sign CSR requests 144. In some embodiments, key storage may be implemented differently than shown. For example, in one embodiment, the UID key may be stored in key storage 330 rather than via fuses 332.

PKA IP circuit 344 may generate various intermediate results during operation and may write the results to PKA memory 346. PKA memory 346 may further include a ROM that may store command sequences and other information used by PKA IP circuit 344. Accordingly, in some cases, memory 346 may store private keys or values derived from private keys in key storage 330 and fuses 332. To further enhance security, each subcommand sequence from sequencer 342 may include subcommands performed after the result is determined for a given command, to overwrite the memory locations in memory 346 that were used during processing of the given command. Any data may be written. For example, in an embodiment, zeros may be written. Alternatively, ones may be written, or any other data pattern may be used. Different patterns may be written at different times.

Any set of commands to PKA 230A may be supported. For example, in an embodiment, one or more of the following commands may be supported: public key extraction (with returns a public key from storage 330 or fuses 332), digital signature generation, digital hash, encryption, and decryption. In an embodiment, the public key extraction, digital signature generation, and digital hash may be elliptical-curve Diffie-Hellman operations. The encryption and decryption may be RSA encryption-based. Each command may be sequenced into multiple subcommands for PKA IP circuit 344, the authentication circuit 230C, and/or the random number generator 230B.

Authentication circuit 230C may implement an authentication algorithm. For example, authentication circuit 230C may implement secure hash algorithms (SHA) such as SHA-1 or SHA-2, or any other authentication algorithms. Random number generator 230B may include any circuitry for generating a random or pseudo-random number. A source of randomness (e.g. temperature) may be used to improve the randomness of the generation. There may be various other security peripherals 230D.

In addition to security peripherals designed to perform specific functions, there may also be security peripherals that are interface units for secure interfaces such as the secure interface unit 230E. In the illustrated embodiment, the secure interface unit 230E may be an interface to an off SOC 110 ("off-chip") secure memory. For example, the interface may an interface to an off SOC Smart Card.

The security peripherals 230B-230E may have programming interfaces, which may be used by SEP processor 210 (and more particularly by software executing on SEP processor 210) to invoke security peripherals 230B-230E to perform a particular task. For example, the peripherals may include a register that may be read and written to control operation of the security peripherals. The peripherals may include a command interface that receives and interprets write operations as commands to be performed. Any interface for invoking the security peripherals may be used.

Turning now to FIG. 4, a block diagram of secure ROM 220 is depicted. As noted above, secure ROM 220 may include software executable by SEP 114 (and, more specifically, processor 210) to implement functionality of SEP 114. In the illustrated embodiment, ROM 220 includes program instructions for a key manager 410, key generator 420, and CSR generator 430. In another embodiment, software components 410-430 may be located in a secure zone of memory 130. In other embodiments, software components 410-430 may be located in other suitable forms of non-transitory computer readable media. Generally speaking, a computer readable medium may include, for example, magnetic or optical media (e.g., disk (fixed or removable), tape, CD-ROM, DVD, or Blu-Ray), volatile or non-volatile memory media (e.g., synchronous dynamic RAM (SDRAM), Rambus DRAM (RDRAM), static RAM (SRAM), ROM, or Flash memory).

Key manager 410, in one embodiment, is executable to manage use of private keys 424. In the illustrated embodiment, key manager 410 receives use requests 412 (i.e., requests to perform operations using stored private keys 424) and corresponding data 414 from applications 132 via secure mailbox 320. Upon receiving a request 412 to a use a key 424, key manager 410 may determine the corresponding intended use and usage criteria, which, in the illustrated embodiment, are stored as access control lists 426. Key manager 410 may then verify that the requested operation is accordance with the intended use and that the usage criteria have been satisfied. In response to a successful verification, key manager 410 may issue one or more corresponding commands to PKA 230A along with data 414 to cause it to perform the requested operation on the data 414. Key manager 410 may then return the result of the operation as data 414 to the requesting application 132. In response to an unsuccessful verification, key manager 410 may send data 414 indicating a failure to service the request 412.

Access control lists 426 may correspond to any of various usage criteria. As noted above, these criteria may include the requirement for using biosensor 120 when a key 424 is to be used. Accordingly, in some embodiments, key manager 410 may issue a request for biosensor 120 to collect biometric data, and key manager 410 (or another element within SEP 114) may verify the captured biometric data. In one embodiment, manager's 410 may issue this request to the initial application submitting the request 412. The application 132 may, in turn, activate sensor 120 and present a corresponding prompt soliciting action from the user. Once biometric information is received at sensor 120, sensor 120 may convey the biometric information via an encrypted connection with SEP 114 for analysis by manager 410. In embodiments in which finger print data is collected, the usage criteria may specify the particular finger (or fingers) to be verified. For example, an access control list 426 may specify that only verification of a thumb permits use of a private key 424. In some embodiments, an access control list 426 may further specify a particular ordering of fingers—e.g., that the right thumb must be verified first and then the right index finger before use a private key 424 is permitted. As noted above, these usage criteria may include a requirement for collecting a passcode when a key is to be used. Accordingly, in some embodiments, key manager 410 may issue a request for a touch screen interface to present a passcode menu to a user, and key manager 410 (or another element within SEP 114) may verify the captured passcode. In some embodiments, these usage criteria may specify that at least one of multiple requirements be met—e.g., successfully verified biometric data or a successfully verified passcode. In some embodiments, these usage criteria may specify multiple requirements to be met—e.g., successfully verified biometric data and a successfully verified passcode.

In some embodiments, key manager 410 may also perform roles other than servicing requests 412. For example, in one embodiment, key manager 410 may invalidate keys for revoked certificates 146 or expired certificates 146. In some embodiments, invalidating a key may include setting a flag in key storage 330 or deleting a key from storage 330 (e.g., by overwriting the key with zeros). In one embodiment, key manager 410 may also invalidate keys 424 at the request of applications 132. In one embodiment, key manager 410 may also invalidate keys 424 if the biometric data stored by SEP 114 for authentication purposes changes.

Key generator 420, in one embodiment, is executable to generate key pairs having a respective public key 422 and a respective private key 424. In the illustrated embodiment, key generator 420 generates a key pair in response to receiving a certified key request 142 via mailbox 320. Although a single request 142 is shown, in other embodiments, key generator 420 may receive separate requests for key generation and certification—e.g., a first request from an application 132 to create a key pair for the application 132 and a second request from the application 132 to obtain a certificate for the key pair.) Keys 422 and 424 may be generated in software, hardware, or a combination thereof. Accordingly, in one embodiment, key generator 420 may receive random prime numbers from RNG 230B and use the numbers to compute a key pair. In another embodiment, key generator 420 may merely serve as a driver, which issues corresponding requests to dedicated hardware that generates keys 422 and 424. In the illustrated embodiment, key generator 420 provides public keys 422 to CSR generator 430 and stores private keys 424 in key storage 330. In such an embodiment, key generator 420 stores private keys with their respective access control lists 426. As note above, in some embodiments, keys 424 may be encrypted together with their respective access control lists 426 (i.e., wrapped together) so that 1) key manager 410 can easily determine what operations are permissible for a given key and 2) it is more difficult to separate a key 424 from its corresponding list 426. In other embodiments, keys 422 and 424 may be communicated differently.

CSR generator 430, in one embodiment, is executable to generate CSRs 144 for received public keys 422. Accordingly, CSR generator 430 may aggregate various information (such as the examples given above with respect to FIG. 1) and assemble the information into a CSR 144, which is issued to CA 140. In the illustrated embodiment, CSR generator 430 communicates with PKA 230A to obtain a private key signature 432 generated from the private key 424 associated with the CSR 144. Once a CSR 144 is assembled, CSR generator 430 may further ask PKA 230A to sign the CSR 144 with UID key 432 and obtain a corresponding UID key signature 434. As discussed above, CA 140 may use UID key signature 434 to verify the identity of SEP 114 before issuing the certificate 146 requested by the CSR 144. In other embodiments, CSR generator 430 may collect information for assembly of CSR 144 in a different manner than shown.

Turning now to FIG. 5A, a flow diagram of method 500 for obtaining a certificate is depicted. Method 500 is one embodiment of a method that may be performed by a secure circuit, which may be included in an integrated circuit such as SEP 114 included in SOC 110. In some instances, performance of method 500 may provide a more secure way to use asymmetric keys for authentication and encryption.

In step 510, a secure circuit generates a key pair having a public key (e.g., public key 422) and a private key (e.g., private key 424). In various embodiment, step 510 may include using software (e.g., key generator 420) and/or hardware (e.g., RNG 230B) within the secure circuit to generate the key pair. In some embodiments, step 510 may include receive, via a mailbox mechanism (e.g., mailbox 320), a first request from an application (e.g., a request 142 from an application 132) that asks to issue a certificate (e.g., certificate 146) to the application.

In step 520, the secure circuit issues a certificate signing request (CSR) (e.g., CSR 144) issue to a certificate authority (CA) (e.g., CA 140) for a certificate corresponding to the key pair. In some embodiments, step 520 includes the secure circuit signing the CSR with the identity key (e.g., UID key 432) that is securely stored in a memory (e.g., key storage 330 or fuses 332) of the secure circuit. In one embodiment, the identity key is stored during fabrication of the secure circuit (e.g., by burning fuses 332).

In some embodiments, method 500 may include additional steps to those shown. In one embodiment, method 500 may include the secure circuit receiving, from the application via the mailbox mechanism, a second request (e.g., use request 412) to perform a cryptographic operation with the private key on a set of data (e.g., data 414) from the application, and the secure circuit may, in response to the second request, perform the cryptographic operation using a public key circuit (e.g., PKA 230A) included in the secure circuit. In various embodiment, the cryptographic operation generates a signature from the set of data, the signature being usable to authenticate the application to a remote service associated with the application. In some embodiments, the certificate issued for the CSR specifies use criteria for the certificate, and the secure circuit verifies (e.g., via key manager 410) that the cryptographic operation is in accordance with the use criteria prior to performing the cryptographic operation. In one embodiment, the secure circuitry may verify that biometric information (e.g., received from biosensor 120) belongs to an authorized user prior to performing the cryptographic operation.

Turning now to FIG. 5B, a flow diagram of a method 550 for using certified keys. Method 550 is one embodiment of a method that may be performed by an application interacting with a secure circuit such as applications 132. In some instances, performance of method 550 may provide a more secure way for an application to use asymmetric keys.

In step 560, an application requests (e.g., via key request 142) creation of a certified key (e.g., private key 424) at a secure circuit (e.g., SEP 114). In such an embodiment, the secure circuit requests (e.g., via CSR 144) a certificate for the key from a certificate authority (e.g., CA 140) and stores the certified key in a memory (e.g., key storage 330) that is inaccessible to a processor (e.g., CPU 112) that executes the application. In some embodiment, step 560 includes issuing an application programming interface (API) call to an operating system of the computing device (e.g., computing device 100), where the operating system issues a corresponding request to a processor (e.g., processor 210) of the secure circuit via a mailbox mechanism (e.g., secure mailbox 320) of the secure circuit.

In step 570, the application receives a certificate (e.g., certificate 146) of the certified key. In one embodiment, the application receives the certificate from the secure circuit, which receives the certificate from the certificate authority.

In another embodiment, the application receives the certificate directly from the certificate authority.

In step 580, the application presenting the certificate to an entity external to the computing device. In some embodiments, the application also presents a signature to the entity that is generated by the secure circuit using the certified key. The entity may then authenticate a user of the application by verifying the signature against the presented certificate.

Turning now to FIG. 6, a method 600 for performing cryptographic operations using generated keys is depicted. Method 600 is one embodiment of a method that may be performed by a secure circuit, which may be included in a computing device such as SEP 114 within computing device 100. In some instances, performance of method 600 may provide a more secure way for an application to use cryptographic keys.

In step 610, a public key and a private key (e.g., keys 422 and 424) are generated for an application (e.g., an application 132). In some embodiments, step 610 may be performed in response to a request from the application via an application programming interface (API). In such an embodiment, the API may allow access to the secure circuit via a mailbox mechanism of the circuit (e.g., secure mailbox 320). The API may also be supported by an operating system of the computing device that is executable to write an instruction to an address of the mailbox to cause the secure circuit to generate the keys. In some embodiments, the application may also request a certificate corresponding to the public key and the private key. In such an embodiment, the secure circuit may issue, to a certificate authority (CA), a certificate signing request (CSR) for the certificate.

In step 620, a request to perform a cryptographic operation using the private key is received from the application via an application programming interface (API). In such an embodiment, the request may be an API call that causes the operating system to write an instruction to an address of the mailbox to cause the secure circuit to perform the requested operation. In some embodiments, the private key may be stored with an access control list (e.g., an access control list 426) that defines criteria for permitting use of the private key. In such an embodiment, the secure circuit may verify that the criteria are satisfied prior to performing the cryptographic operation. In some embodiments, a network interface of the computing device receives the request from the application via a network connection with an external device (i.e., a device external to computing device 100).

In step 630, the cryptographic operation is performed in response to the request. This operation may include encryption, decryption, signature generation, etc. In some embodiments, step 630 may include the secure circuit communicating a corresponding result from the cryptographic operation to the application. In one embodiment, this result may be returned via the API—e.g., the secure circuit may invoke an interrupt of the operating system that causes the operating system to retrieve the result from the mailbox and deliver it to the application as a response to the API call.

Various embodiments of systems and methods for using public key encryption are contemplated based on the preceding description, including, but not limited to, the embodiments listed below.

In one embodiment, a method comprises an application in a computing device requesting creation of a certified key at a secure circuit that is configured to request a certificate for the key from a certificate authority and to store the certified key in a memory that is inaccessible to a processor that executes the application. The method further comprises the application receiving a certificate of the certified key and the application presenting the certificate to an entity external to the computing device. In some embodiments, the method comprises the application presenting a signature to the entity. The signature is generated by the secure circuit using the certified key, and wherein the entity is able to authenticate a user of the application by verifying the signature against the presented certificate. In some embodiments, the requesting includes issuing an application programming interface (API) call to an operating system of the computing device, wherein the operating system issues a corresponding request to a processor of the secure circuit via a mailbox mechanism of the secure circuit. In some embodiments, the certificate includes information that identifies one or more hardware circuits present in the computing device. In one embodiment, the certificate identifies the secure circuit as being included in the computing device.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
   an integrated circuit that includes at least one processor and a secure circuit, wherein the secure circuit is configured to:
   store a key that is inaccessible to instructions executed on the processor;
   send a request for a certificate associated with the key to a certificate authority (CA); and
   create a signature signed with the key; and
   a biometric sensor configured to:
   receive biometric information from a user of the computing device; and
   wherein the secure circuit is configured to:
   before permitting creation of the signature, compare the received biometric information with biometric information of an authorized user.

2. The computing device of claim 1, wherein the certificate is usable to verify that the secure circuit is in possession of the key, but does not specify information usable to determine an identity of the computing device.

3. The computing device of claim 1, wherein the certificate specifies a set of use criteria for the key; and
   wherein the secure circuit is configured to:
   verify that creation of the signature is in accordance with the set of use criteria prior to creating of the signature.

4. The computing device of claim 3, wherein the key is associated with an application executable on the processor, and wherein the request includes the set of use criteria as defined by the application.

5. The computing device of claim 1, wherein the biometric sensor is a finger print sensor configured to receive finger print information from a user of the computing device.

6. The computing device of claim 1, further comprising:
   a user interface circuit configured to receive a passcode from a user of the computing device; and
   wherein the secure circuit is configured to verify the passcode before permitting creation of a signature.

7. The computing device of claim 1, wherein the secure circuit is configured to:
   receive an indication that the CA has revoked the certificate; and
   in response to the indication, delete the key from a memory of the secure circuit.

8. The computing device of claim 1, wherein the secure circuit is configured to:
   store a plurality of keys, each associated with a respective one of a plurality of applications executable to request performance of cryptographic operations by the secure circuit.

9. The computing device of claim 8, wherein the plurality of applications includes an application that is located externally to the computing device.

\* \* \* \* \*